United States Patent
Zhao et al.

(10) Patent No.: US 9,648,150 B1
(45) Date of Patent: May 9, 2017

(54) ONE PIECE CONDUCTIVE HOUSING WITH INCORPORATED ANTENNA FOR USE IN AN ELECTRONIC DEVICE

(71) Applicant: Motorola Mobility LLC, Chicago, IL (US)

(72) Inventors: Jun Zhao, Vernon Hills, IL (US); Eric Krenz, Crystal Lake, IL (US); Ugur Olgun, Chicago, IL (US); Hugh Smith, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/235,065

(22) Filed: Aug. 11, 2016

(51) Int. Cl.
*H01Q 1/24* (2006.01)
*H04M 1/02* (2006.01)
*H04B 1/3827* (2015.01)

(52) U.S. Cl.
CPC .......... *H04M 1/026* (2013.01); *H04B 1/3827* (2013.01)

(58) Field of Classification Search
None
See application file for complete search history.

(56) References Cited

U.S. PATENT DOCUMENTS

| | | | | |
|---|---|---|---|---|
| 2009/0046022 A1* | 2/2009 | Desclos | ................. | H01Q 1/362 343/702 |
| 2014/0266938 A1* | 9/2014 | Ouyang | ................. | H01Q 5/321 343/729 |
| 2014/0313086 A1* | 10/2014 | Montevirgen | ......... | H01Q 1/243 343/702 |
| 2016/0226130 A1 | 8/2016 | Allore et al. | | |
| 2016/0301139 A1 | 10/2016 | Lombardi et al. | | |

OTHER PUBLICATIONS

Ugur Olgun, et al., "NFC Antenna Architecture for Mobile Communication Device with Single-Piece Metal Housing", U.S. Appl. No. 14/824,240, filed Aug. 12, 2015, Jan. 4, 2017.
Ugur Olgun, et al., "Wireless Charging Architecture for Mobile Communication Device with Single-Piece Metal Housing", U.S. Appl. No. 14/872,322, filed Oct. 1, 2015.
Abu Sayem, et al., "Antenna System Including Closely Spaced Antennas Adapted for Operating at the Same or Similar Frequencies", U.S. Appl. No. 15/235,757, filed Aug. 12, 2016.

* cited by examiner

*Primary Examiner* — David Bilodeau
(74) *Attorney, Agent, or Firm* — Watson Intellectual Property Group

(57) ABSTRACT

The present application provides a housing for an electronic device having wireless communication capabilities including an antenna incorporated as part of the housing. The housing includes a one piece conductive housing having an outer edge. One or more windows are located entirely within the one piece conductive housing, where each of the one or more windows has a perimeter. At least a first window of the one or more windows is positioned within the one piece conductive housing proximate a portion of the outer edge of the one piece conductive housing. At least one drive signal is applied across the first window of the one or more windows, which is positioned proximate the outer edge of the one piece conductive housing, at a respective pair of points along the perimeter of the first window.

20 Claims, 3 Drawing Sheets

ONE PIECE CONDUCTIVE HOUSING WITH INCORPORATED ANTENNA FOR USE IN AN ELECTRONIC DEVICE

FIELD OF THE APPLICATION

The present disclosure relates generally to electronic devices with an antenna, and more particularly, electronic devices where the antenna is incorporated as part of a one piece conductive housing.

BACKGROUND

Electronic devices, such as smartphones, are increasingly supporting use cases, where for certain functionality, it is desirable for the device to be able to support a larger display size. For example, larger display sizes can be desirable for viewing visual content as part of a media player or a browser, as well as for supporting the visual presentation of information as part of an application or program that is being executed by the device. However, such a trend needs to be balanced with a general desire for the overall size of the device to stay the same and even decrease in one or both of dimension and weight.

In an attempt to support larger display sizes without increasing the overall size of the device, device manufacturers have increasingly dedicated a larger percentage of the exterior surface to a display, where the display in many instances has grown in one or more dimensions to a size that dominates a particular surface, such as the front surface of the device. In at least some of these instances, the display has been allowed to extend into areas that had previously been used to support user inputs, such as areas of the surface that have previously supported a keypad, such as a numeric keypad.

Larger displays often mean larger openings in the housing, which can reduce the amount of material that is available to support the structural integrity of the housing, and correspondingly the device. As such, manufacturers are increasingly relying upon materials in the formation of the device housings, such as metals, that have historically better maintained structural integrity with less overall material. This is true for devices having a full metal rear housing, as well as devices that incorporate perimeter metal housings. However, housings made from conductive materials, such as metal, can interfere with the transmission and reception of wireless signals into and out of the device. Further openings can be made in the housing proximate the location of the antennas, which support wireless communication signal transmission/reception, in order to create an area through which wireless signaling can propagate. Alternatively, the antennas can be formed into the housing materials with cuts and/or further openings which isolate the antenna portions from the non-antenna portions of the housing. However, to the extent that cuts or further openings need to be made in the housing, the further openings and/or cuts can further affect the structural integrity. The further openings and/or cuts can also affect the aesthetics of the device.

The present innovators have recognized that one or more voids, openings or windows in a conductive housing can be used to support a radio frequency electromagnetic energy radiating and/or a radio frequency electromagnetic energy sensing structure, which is internal to the outer perimeter of the device, and therefore allows for a device having a one piece housing with an uninterrupted outer perimeter, which supports the transmission and reception of radio frequency electromagnetic energy into and out of the device.

SUMMARY

The present application provides a housing for an electronic device having wireless communication capabilities including an antenna incorporated as part of the housing. The housing includes a one piece conductive housing having an outer edge. One or more windows are located entirely within the one piece conductive housing, where each of the one or more windows has a perimeter. At least a first window of the one or more windows is positioned within the one piece conductive housing proximate a portion of the outer edge of the one piece conductive housing. At least one drive signal is applied across the first window of the one or more windows, which is positioned proximate the outer edge of the one piece conductive housing, at a respective pair of points along the perimeter of the first window.

In at least one embodiment, the first window of the one or more windows has a perimeter that is substantially rectangular in shape. The substantially rectangular in shape perimeter of the first window of the one or more windows includes a first pair of opposing sides and a separate second pair of opposing sides, where the first pair of opposing sides of the perimeter of the first window are shorter than the second pair of opposing sides of the perimeter of the first window. In at least some instances, the at least one drive signal includes a drive signal that is applied across a pair of points along the perimeter of the first window that are each respectively associated with a different one of the first pair of opposing sides of the perimeter, which are relatively shorter than the second pair of opposing sides of the perimeter. In at least some instances, the at least one drive signal includes a drive signal that is applied across a pair of points along the perimeter of the first window that are each respectively associated with a different one of the second pair of opposing sides of the perimeter, which are relatively longer than the first pair of opposing sides of the perimeter.

In at least a further embodiment, multiple signal sources are each coupled to a different respective pair of points along the perimeter of the first window, wherein the first signal source is associated with a first drive signal of the at least one drive signal, and a second signal source is associated with a second drive signal of the at least one drive signal. Being coupled to a different respective pair of points along the perimeter of the first window serves as a diplexer for merging multiple signal sources and applying the same to the antenna incorporated as part of the housing.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 1:
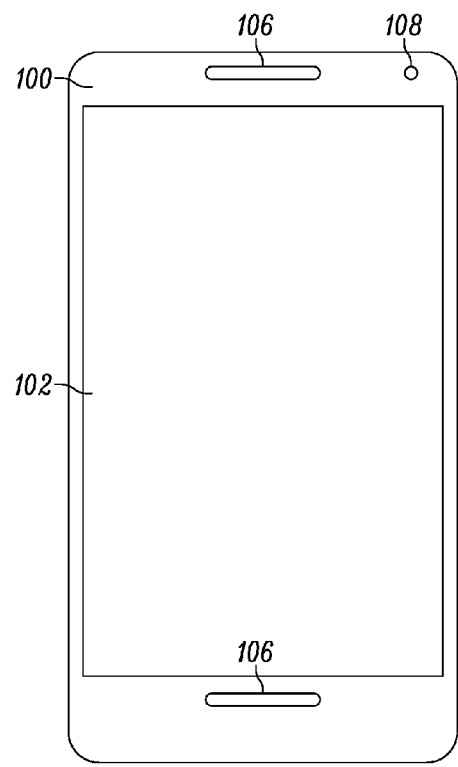
FIG. 1 is a front view of an exemplary wireless communication device.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

FIG. 1 illustrates a front view of an exemplary wireless communication device 100, such as a wireless communication device. While in the illustrated embodiment, the type of wireless communication device shown is a radio frequency cellular telephone, other types of devices that include wireless radio frequency communication capabilities are also relevant to the present application. In other words, the present application is generally applicable to wireless communication devices beyond the type being specifically shown. A couple of additional examples of suitable wireless communication devices that may additionally be relevant to the present application in the incorporation and management of an antenna as part of the housing can include a tablet, a laptop computer, a desktop computer, a netbook, a cordless telephone, a selective call receiver, a gaming device, a personal digital assistant, as well as any other form of wireless communication device that might be used to manage wireless communications including wireless communications involving one or more different communication standards. A few examples of different communication standards include Global System for Mobile Communications (GSM) Code Division Multiple Access (CDMA), Orthogonal Frequency Division Multiple Access (OFDMA), Long Term Evolution (LTE), Global Positioning System (GPS), Bluetooth®, Wi-Fi (IEEE 802.11), Near Field Communication (NFC) as well as various other communication standards. In addition, the wireless communication device 100 may utilize a number of additional various forms of communication including systems and protocols that support a communication diversity scheme, as well as carrier aggregation and simultaneous voice and data that concurrently enables the use of simultaneous signal propagation.

In the illustrated embodiment, the radio frequency cellular telephone includes a display 102 which covers a large portion of the front facing. In at least some instances, the display can incorporate a touch sensitive matrix, that can help facilitate the detection of one or more user inputs relative to at least some portions of the display, including an interaction with visual elements being presented to the user via the display 102. In some instances, the visual element could be an object with which the user can interact. In other instances, the visual element can form part of a visual representation of a keyboard including one or more virtual keys and/or one or more buttons with which the user can interact and/or select for a simulated actuation. In addition to one or more virtual user actuatable buttons or keys, the device 100 can include one or more physical user actuatable buttons 104. In the particular embodiment illustrated, the device has two such buttons located along the right side of the device.

The exemplary hand held electronic device, illustrated in FIG. 1, additionally includes a pair of speakers 106. The speakers 106 may support the reproduction of an audio signal, which could be associated with an ongoing voice communication or the playback of a streaming or stored media file, which can include a stand-alone signal, such as for use in the playing of music, or can be part of a multimedia presentation, such as for use in the playing of a movie, which might have at least an audio as well as a visual component. One or more of the speakers may also include the capability to also produce a vibratory effect. However, in some instances, the purposeful production of vibrational effects may be associated with a separate element, not shown, which is internal to the device.

In the present instance a pair of speakers can support the reproduction of stereophonic sound including both a left and a right channel associated with when the device is oriented in landscape mode, such as for viewing the playback of a movie. Otherwise, at least one of the speakers is located toward the top of the device, which corresponds to an orientation consistent with the respective portion of the device facing in an upward direction during usage in support of a voice communication. In such an instance, at least a corresponding one of the speakers 106 might be intended to align with the ear of the user, and at least one of one or more microphones (not shown) might be intended to align with the mouth of the user, which is often generally opposite the corresponding speaker 106 at a location at or proximate the bottom of the device. Also located near the top of the device, in the illustrated embodiment, is a front facing camera 108. The wireless communication device will also generally include one or more radio frequency transceivers, as well as associated transmit and receive circuitry, including one or more antennas that may be incorporated as part of the housing of the device 100.

Figure 2:
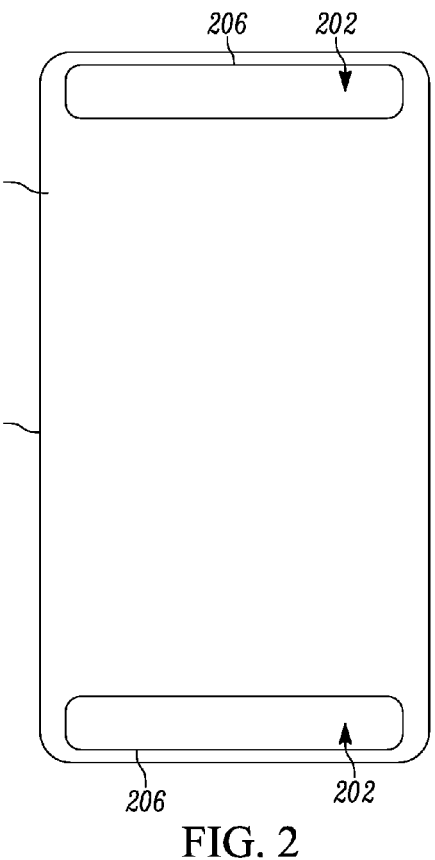
FIG. 2 is a front view of a one piece conductive housing with one or more openings or windows in the conductive housing including a respective pair of exemplary windows.

FIG. 2 illustrates a front view of a one piece conductive housing 200 with one or more openings or windows in the conductive housing 200 including a respective pair of exemplary windows 202, which in at least some instances are referred to as radio-frequency (RF) windows. In the illustrated embodiment, the windows are each proximate a respective edge of the conductive housing, where the windows are generally internal to the conductive housing 200 without going beyond the conductive housing's outer edge 204. This allows the outer edge 204 of the conductive housing to remain uninterrupted by the one or more openings or windows, which can form entirely within the constraints of the conductive housing. The windows each have a perimeter 206, which defines the size of the window 202 within the overall construction of the conductive housing body 200. By being positioned within the constraints of the conductive housing 200, and having an outer edge which remains uninterrupted, the housing also provides for a conductive path via which electrical currents can flow, which extends outside the perimeter 206 of the window 202.

In at least some instances, the conductive housing is formed from metal, and allows for a uni-body metal construction having a seamless metal outer edge, which coincides with the surrounding sidewall of the device 100. Openings can exist in the sidewall, which allows for features such as the placement of physical user actuatable buttons 104, as well as various other porting such as headphone jack, microphone ports, and memory card slots. The conductive housing body 200 can coincide with an external surface such as the back of the device. Alternatively, the housing body 200 can receive one or more additional material layers, such as a decorative plastic or wood back panel, thereby placing at least some portions of the housing body closer to an interior space of the device 100. On the front of the device a plastic or glass lens cover can extend beyond the boundaries of the display 102 to provide a more uniform look and an area under which the windows 202 can be located without a conductive structure interfering with the transmission and/or reception of radio frequency signals.

In the illustrated embodiment, the conductive housing body 200 is substantially rectangular in shape and has two sets of opposing sides corresponding to the outer edge 204, a first set and a second set of opposing sides, where the first set of sides are longer than the second set of opposing sides. However, while the conductive housing body 200 in the illustrated embodiment is substantially rectangular in shape, there is no requirement that the shape be rectangular. In the illustrated embodiment, the two windows 202 are each respectively located proximate a corresponding one of the shorter pair of opposing sides of the conductive housing body 200. Further, the windows 202, in at least the illustrated embodiment, are located in the area proximate the outer edge of the conductive housing body 200 between the end of the display 102 and the end of the device 100. Locating the windows proximate the ends, places the windows 202 further away from display 102 which could affect radio frequency transmissivity. This also creates an area between the windows 202 proximate the back of the device 100 where a coil structure can be located, that can be used to support near field communications and/or wireless charging.

Figure 3:
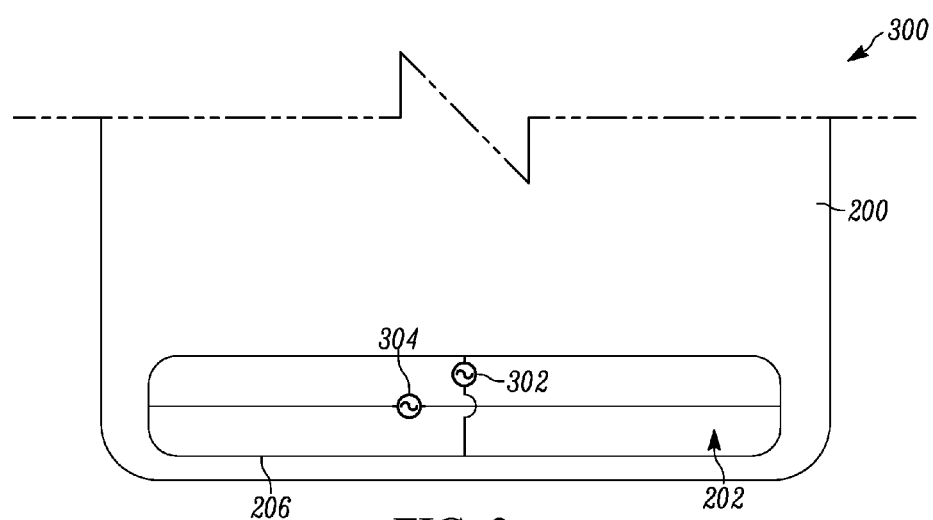
FIG. 3 is a partial front view of the one piece conductive housing and one of the one or more openings or windows.

FIG. 3 illustrates a partial front view 300 of the one piece conductive housing 200 and one of the one or more openings or windows 202. In the illustrated embodiment, a pair of drive signals 302 and 304 are each separately applied across one of the windows 202. More specifically, a first drive signal 302 is applied across a first pair of opposing sides associated with the perimeter 206 of the window 202, and a second drive signal 304 is applied across a separate second pair of opposing sides associated with the perimeter 206. In the illustrated embodiment, the shape of the window is generally rectangular, where the first pair of opposing sides are longer than the second pair of opposing sides. More specifically, in the illustrated embodiment, a long side of the perimeter of the window 202 is adjacent a short side of outer edge of conductive housing body 200. In at least some instances, the drive signals can include a single direct contact from a printed circuit substrate including the transmit and/or receive circuitry to the conductive housing thereby providing a common mode feed for supporting wireless communications including cellular and near field communications.

Figure 4:
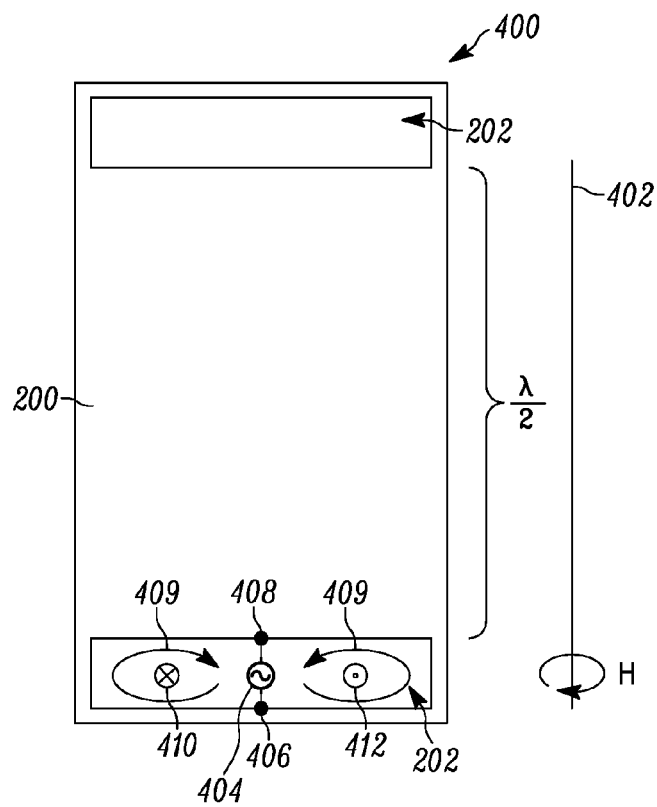
FIG. 4 is a schematic view of the radiating structure included in the one piece conductive housing, and the corresponding electrical approximation.

FIG. 4 illustrates a schematic view 400 of the radiating structure, namely the window 202, included in the one piece conductive housing body 200, and the corresponding electrical approximation 402. In the illustrated embodiment, a drive signal 404 is shown being applied across one of the windows 202, and more specifically across the longer ones of the two pairs of opposing sides of the perimeter of the rectangular shaped window 202. Correspondingly, the drive signal will alternatively induce a positive and a negative current in the directions of the two arrows 409, where the current will flow from a first one 406 of the points where the source is coupled to the perimeter around the window to the second one 408 of the points where the source is coupled to the perimeter. Such an embodiment forms what is sometimes referred to as a dual loop antenna configuration.

Because the prominent direction in which the current flows along the long side of perimeter of the window 202 is in opposite directions in the respective loops, the currents 409 contribute to a substantial cancellation in the associated electric fields. However, each respective loop induces a corresponding magnetic field 410 and 412 having an opposite direction, where the magnetic fields that are produced will change direction with a change in the polarity of the drive signal 404 being applied across the respective points 406 and 408 of the perimeter of the opening 202. The magnetic fields, which are produced have a direction, which is largely into and out of the page. The resulting magnetic field will induce a current in the rest of conductive housing body 200. In essence, the conductive housing body for certain frequencies will function as a half wavelength dipole in a lengthwise direction, which is driven by the magnetic fields being produced. For many handheld devices, the size of the conductive housing body in combination with the magnetic drive fields supports reasonably good efficiencies in the bands around 800 MHz.

Figure 5:
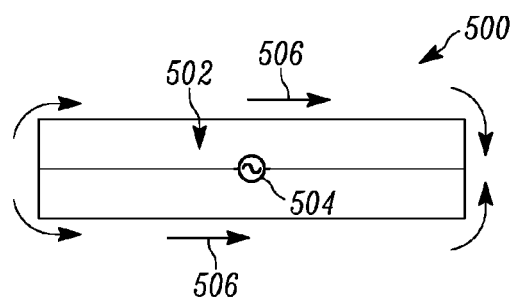
FIG. 5 is a partial schematic view including an exemplary drive configuration associated with an opening or window in the one piece conductive housing.

Additionally and/or alternatively, a drive signal 504 can be applied across one of the windows 502, across the shorter ones of the two pairs of opposing sides of the perimeter of the rectangular shaped window. FIG. 5 illustrates a partial schematic view 500 of such an exemplary drive configuration associated with an opening or window in the one piece conductive housing. Similar to the drive configuration illustrated in FIG. 4, the drive configuration in FIG. 5 will form a dual loop antenna configuration.

In the arrangement illustrated in FIG. 5, a quarter wave width mode dipole in the conductive housing body is excited. Such an arrangement, illustrated in FIG. 5, can at least sometimes be less efficient than the arrangement illustrated in FIG. 4. While diplexing, where multiple drive signal arrangements are combined, can be done by applying both sets of signals through appropriate filtering components to the same source, the differences in the operation of the resonant characteristics of the conductive housing body and corresponding windows, which is dependent upon the nature in which the drive signals are coupled to the perimeter of the window, can serve to produce a natural structural diplexing of the signals. In turn, multiple types of driving arrangements including both of the types highlighted in each of FIGS. 4 and 5 can be used to support distinct types of wireless communication signals, as well as signal diversity relative to the same type of signals.

In some instances, signal diversity can be supported through the application of multiple sets of drive signals across the same window, in other instances signal diversity can be supported through the application of multiple sets of drive signals across multiple windows. An example of a conductive housing body having multiple windows is illustrated in FIGS. 2 and 4, where a respective window 202 proximate the edge 206 of the conductive housing body 200 is shown at each of the top and the bottom. Each window can include one or more signal sources coupled to various points around the perimeter for use in supporting the transmission and receipt of wireless communication signals.

While the relative efficiencies between the manner in which various types of connections to the perimeter are made can affect the suitability of using the different types of connections together in supporting signal diversity, some coupling arrangements of the signal sources to the perimeter may enhance or degrade the relative performance between each of efficiency and signal correlation. Generally, for signal diversity less correlation is better, as well as minimizing the differences in signal strength and efficiency of the multiple signals. However, in some instances it may be possible to sacrifice performance relative to signal correlation for better performance in relative efficiency, and vice versa. In some cases, such a compromise can be realized through a selection of different points on the perimeter of the window across which a signal source is applied. In one such instance, FIG. 6 illustrates a partial schematic view 600 including a further exemplary signal source drive configuration associated with an opening or window 602 in the one piece conductive housing 200.

Figure 6:
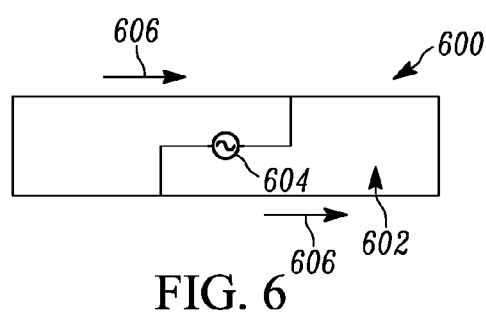
FIG. 6 is a partial schematic view including an exemplary drive configuration associated with an opening or window in the one piece conductive housing.

More specifically, FIG. 6 illustrates a drive signal 604 being applied across the longer ones of the two pairs of opposing sides of the perimeter of the rectangular shaped window 602. However, as opposed to being coupled to the perimeter at points directly across from one another, the points on the perimeter that are coupled to the drive signal are offset from one another in a direction along the length of the longer ones of the two pairs of opposing sides. Such a displacement, away from a point of connection that might be centered along the side wall of the perimeter, serves to increase the distance along the longer ones of the two pairs of opposing sides that the currents 606 are moving in a parallel direction. This can have an effect on the resulting efficiency in the operation of conductive housing body in combination with the windows located therein as functioning as a structure for transmitting and receiving wireless signals. However, such a displacement of the points on the perimeter across which the signal source is applied may have an impact on the degree of correlation with other signal sources being coupled across other different points along the perimeter of the window 602, such as the examples shown in FIGS. 4 and 5.

Figure 7:
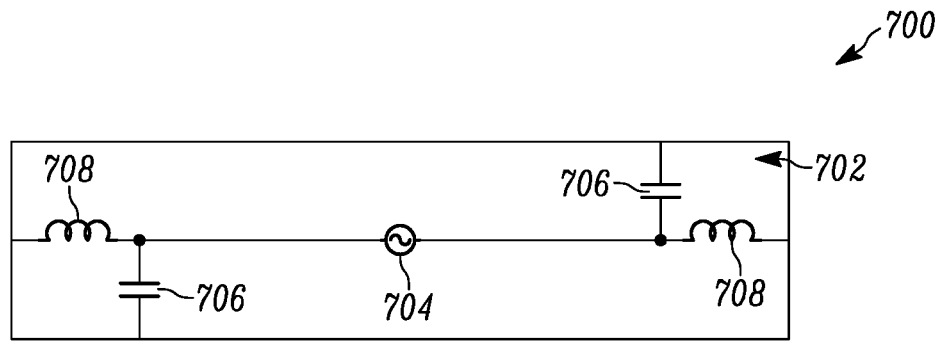
FIG. 7 is a partial schematic view including an exemplary drive configuration associated with an opening or window in the one piece conductive housing.

FIG. 7 illustrates a partial schematic view 700 including a still further exemplary drive configuration associated with an opening or window 702 in the one piece conductive housing. In the illustrated embodiment, the same source 704 is coupled to different sets of points along the perimeter of the window 702 via a pair of capacitors 706 and alternatively a pair of inductors 708. Dependent upon the values of the capacitors 706 and inductors 708, different sets of frequency signals may be more or less likely to be coupled to the perimeter via the alternative sets of signal paths. Capacitors are more likely to allow more of a higher frequency signal to traverse the component to the associated point on the perimeter, while inductors are more likely to allow more of a lower frequency signal to traverse the component to the associated point on the perimeter. In at least one envisioned embodiment, relatively lower frequency near field communication (NFC) signals are intended to be coupled to the perimeter of the window via the respective inductors 708, and relatively higher frequency cellular radio frequency signals are intended to be coupled to the perimeter of the window via the respective capacitors 706. In such an instance, the inductor/capacitor combination serves as a filter that produces a diplexing effect, that can allow multiple sets of signals to be driven using a single signal source.

In at least one embodiment, it is envisioned that the upper window of a conductive housing in a particular wireless communication device, such as a radio frequency cellular telephone would support both a near field communication antenna feed and a diversity cellular antenna feed, while the lower window in the conductive housing in a particular radio frequency cellular telephone would support the main cellular antenna feed. It is envisioned that the upper window of a conductive housing in a different wireless communication device might support a near field communication antenna feed, while the lower window in the conductive housing might support both a main cellular antenna feed and a diversity cellular antenna feed.

While many of the illustrated embodiments have a substantially rectangular shaped conductive housing body with windows located proximate the shorter sides of the outer edge of the conductive housing body, near both the top and the bottom of the device where the longer side of the window is proximate the shorter side of the conductive housing body, the teachings of the present application are not restricted to such an embodiment. For example, the conductive housing body can have both more than two and less than two windows. Furthermore, the windows can be more or less proximate the outer edge of the conductive housing body, and can also coincide with both the longer and the shorter edge of the conductive housing body. It is further possible that the overall shape may not have a set of longer and a set of shorter sides, such as in the case of a circle or a square shaped conductive housing.

Figure 8:
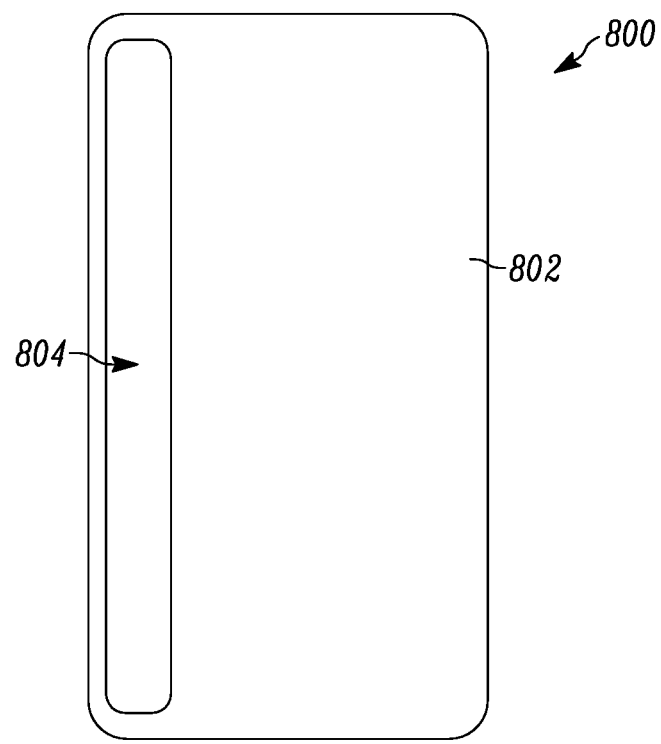
FIG. 8 is a further front view of a one piece conductive housing with an alternative example of one or more openings or windows in the conductive housing.

In many instances, the desired purpose of the device, as well as the placement of other components, which are intended to support the desired purpose of the device, will help dictate where the windows should be placed in the conductive housing body to best meet the needs of the device and the corresponding wireless communications. For example, FIG. 8 illustrates a further front view 800 of a one piece conductive housing 802 with an alternative example of one or more openings or windows 804 in the conductive housing, where the window is more closely aligned with a longer one of the external edges of the conductive housing. Correspondingly, one or more drive signals could be applied across the window at respective pairs of points along the perimeter of the window. Furthermore, while the window is shown as extending a substantial portion of the full length of the associated side, there is no need for the window to extend the full length of any particular side of the conductive housing.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A housing for an electronic device having wireless communication capabilities including an antenna incorporated as part of the housing, said housing comprising:
  a one piece conductive housing having an outer edge, the one piece conductive housing including one or more windows located entirely within the one piece conductive housing, each window having a perimeter;
  wherein at least a first window of the one or more windows is positioned within the one piece conductive housing proximate a portion of the outer edge of the one piece conductive housing; and
  wherein at least one drive signal is applied across the first window of the one or more windows, which is positioned proximate the outer edge of the one piece conductive housing, at a respective pair of points along the perimeter of the first window.

2. A housing in accordance with claim 1, wherein the one piece conductive housing is a one piece metal housing.

3. A housing in accordance with claim 2, wherein the one or more windows are cutouts in the one piece metal housing.

4. A housing in accordance with claim 1, wherein the outer edge is a seamless outer edge.

5. A housing in accordance with claim 1, wherein the overall outer shape of the one piece conductive housing is substantially rectangular.

6. A housing in accordance with claim 5, wherein the substantially rectangular overall outer shape of the one piece conductive housing includes a first pair of opposing sides and a separate second pair of opposing sides, where the first pair of opposing sides of the one piece conductive housing are shorter than the second pair of opposing sides of the one piece conductive housing.

7. A housing in accordance with claim 6, wherein the first window of the one or more windows is positioned proximate one of the first pair of opposing sides of the one piece conductive housing, which are shorter than the second pair of opposing sides of the one piece conductive housing.

8. A housing in accordance with claim 7, wherein the one or more windows includes a second window, which is positioned within the one piece conductive housing proximate a portion of the outer edge of the one piece conductive housing, which is different than the portion of the outer edge to which the first window of the one or more windows is proximate.

9. A housing in accordance with claim 8, where the portion of the outer edge that the second window is positioned proximate includes one of the first pair of opposing sides that is opposite the side that the first window is positioned proximate.

10. A housing in accordance with claim 7, wherein the first window of the one or more windows has a perimeter that is substantially rectangular in shape.

11. A housing in accordance with claim 10, wherein the substantially rectangular in shape perimeter of the first window of the one or more windows includes a first pair of opposing sides and a separate second pair of opposing sides, where the first pair of opposing sides of the perimeter of the first window are shorter than the second pair of opposing sides of the perimeter of the first window.

12. A housing in accordance with claim 11, wherein the first window of the one or more windows is positioned relative to the portion of the outer edge of the one piece conductive housing, such that one of second pair of opposing sides of the perimeter of the first window, corresponding to one of the relatively longer sides of the perimeter, is positioned proximate one of the first pair of opposing sides of the one piece conductive housing, which are shorter than the second pair of opposing sides of the one piece conductive housing.

13. A housing in accordance with claim 1, wherein the first window of the one or more windows has a perimeter that is substantially rectangular in shape, where the substantially rectangular in shape perimeter of the first window of the one or more windows includes a first pair of opposing sides and a separate second pair of opposing sides, where the first pair of opposing sides of the perimeter of the first window are shorter than the second pair of opposing sides of the perimeter of the first window.

14. A housing in accordance with claim 13, wherein the at least one drive signal includes a drive signal that is applied across a pair of points along the perimeter of the first window that are each respectively associated with a different one of the first pair of opposing sides of the perimeter, which are relatively shorter than the second pair of opposing sides of the perimeter.

15. A housing in accordance with claim 13, wherein the at least one drive signal includes a drive signal that is applied across a pair of points along the perimeter of the first window that are each respectively associated with a different one of the second pair of opposing sides of the perimeter, which are relatively longer than the first pair of opposing sides of the perimeter.

16. A housing in accordance with claim 13, wherein the at least one drive signal includes a drive signal that is applied across a pair of points along the perimeter of the first window that are each respectively associated with a different one of the second pair of opposing sides of the perimeter, which are relatively longer than the first pair of opposing sides of the perimeter, where the respective position of the pair of points across which the drive signal is applied are displaced relative to one another a distance in a direction at least partially along the length of one of the second pair of opposing sides.

17. A housing in accordance with claim 13, wherein the at least one drive signal that is applied across the first window is applied via a pair of terminals, each terminal is coupled to a respective one of the first pair of opposing sides of the perimeter via a respective inductor, and is coupled to a respective one of the second pair of opposing sides of the perimeter via a respective conductor.

18. A housing in accordance with claim 1, wherein multiple signal sources are each coupled to a different respective pair of points along the perimeter of the first window, wherein the first signal source is associated with a first drive signal of the at least one drive signal, and a second signal source is associated with a second drive signal of the at least one drive signal, wherein being coupled to a different respective pair of points along the perimeter of the first window serves as a diplexer for merging multiple signal sources and applying the same to the antenna incorporated as part of the housing.

19. A housing in accordance with claim 1, wherein the one or more windows includes a second window, which is positioned within the one piece conductive housing proximate a portion of the outer edge of the one piece conductive housing, which is different than the portion of the outer edge to which the first window of the one or more windows is proximate.

20. A housing in accordance with claim 1, wherein the electronic device is a hand held cellular radiotelephone.

* * * * *